(12) United States Patent
Su

(10) Patent No.: US 6,951,227 B1
(45) Date of Patent: Oct. 4, 2005

(54) HOSE WITH MULTIPLE HOLES

(76) Inventor: Cheng-Wen Su, No. 26-1, An-Hsi Chuang, An-Hsi Li, Changhwa City, Changhwa Hsien (TW)

( * ) Notice: Subject to any disclaimer, the term of this patent is extended or adjusted under 35 U.S.C. 154(b) by 0 days.

(21) Appl. No.: 10/827,928

(22) Filed: Apr. 20, 2004

(51) Int. Cl.$^7$ .............................................. F16L 11/00
(52) U.S. Cl. ...................... 138/115; 138/109; 138/123
(58) Field of Search ................... 138/115–117, 123, 138/109, 125, 126; 285/124.4, 245

(56) References Cited

U.S. PATENT DOCUMENTS

| | | | | |
|---|---|---|---|---|
| 2,652,093 A | * | 9/1953 | Burton | ......................... 156/86 |
| 2,798,745 A | * | 7/1957 | Nelson | ................... 285/148.13 |
| 2,877,028 A | * | 3/1959 | Knight | ..................... 285/124.4 |
| 3,612,580 A | * | 10/1971 | Jones | ....................... 285/294.2 |
| 3,726,321 A | * | 4/1973 | Phillips et al. | ............... 138/123 |
| 4,043,015 A | * | 8/1977 | Hickman et al. | ............ 165/173 |
| 4,722,559 A | * | 2/1988 | Bongartz | .................. 285/122.1 |
| 4,789,005 A | * | 12/1988 | Griffiths | ...................... 138/103 |
| 4,930,543 A | * | 6/1990 | Zuiches | ....................... 138/110 |
| 6,692,037 B1 | * | 2/2004 | Lin | .......................... 285/124.1 |
| D498,825 S | * | 11/2004 | Fu | .............................. D23/266 |

* cited by examiner

*Primary Examiner*—Patrick Brinson
(74) *Attorney, Agent, or Firm*—William E. Pelton, Esq.

(57) ABSTRACT

A hose with multiple through holes is used to convey fluid, has a hose body having two ends, multiple through holes arranged abreast passing through the hose body longitudinally and two enlarged annular flanges. Some of the multiple through holes maintain fluid flow when the hose body is bent or twisted. The two enlarged annular flanges may be attached respectively to standard connectors so the hose can be readily attached to a standard outlet and sprinkling nozzle.

3 Claims, 3 Drawing Sheets

HOSE WITH MULTIPLE HOLES

BACKGROUND OF THE INVENTION

1. Field of the Invention

The present invention relates to a hose, and more particularly to a hose having multiple through holes formed longitudinally through the hose.

2. Description of Related Art

A conventional hose is used widely to convey fluid like water or oil and has two ends and a through hole passing longitudinally through the hose. To use a hose, one end of the hose is often connected to a source, and the other end is connected to a sprinkling nozzle. The through hole in the hose conveys a fluid from the outlet to the sprinkling nozzle. Thereby, the fluid may be sprayed on a target. However, when the hose twists or bends, kinks often form in the hose and close the through hole, which slows or obstructs the fluid. Furthermore, twisting or bending a hose, especially an older hose, many times make the hose to fail. Therefore, a conventional hose with multiple through holes was developed.

With reference to FIG. 3, a conventional hose with multiple through holes in accordance with the prior art has a hose body (50) and multiple through holes (51). The body (50) is made of a semi-rigid material, is somewhat ribbon shaped and has a width. The through holes (51) pass longitudinally through the hose body (51) and are arranged abreast. The conventional hose with multiple through holes may maintain a sufficient flow rate inside the hose body (50) when the hose body (50) is twisted or bent. However, the conventional hose cannot be connected directly to an outlet or a conventional sprinkling nozzle. To connect the conventional hose, a special connector (70) and a special sprinkling nozzle (60) must be attached respectively to the two ends of the hose body (50). The special connector (70) and sprinkling nozzle (60) have multiple through tubes (71, 61) corresponding to and fitting into the through holes (51) in the hose body (50). Therefore, a separate special connector (70) and sprinkling nozzle (60) must be purchased with the conventional hose.

To overcome the shortcomings, the present invention provides an improved hose to mitigate or obviate the aforementioned problems.

SUMMARY OF THE INVENTION

The main objective of the invention is to provide a hose that maintains a sufficient flow rate when the hose is kinked or bent and can be attached to a standard connector and sprinkling nozzle.

A hose with multiple through holes in accordance with the present invention comprises a hose body having two ends, two openings and a mesh covering.

The two openings are defined respectively at the two ends of the hose body. The mesh covering covers the outer surface of the hose body.

Other objects, advantages and novel features of the invention will become more apparent from the following detailed description when taken in conjunction with the accompanying drawings.

DETAILED DESCRIPTION OF PREFERRED EMBODIMENT

Figure 1:
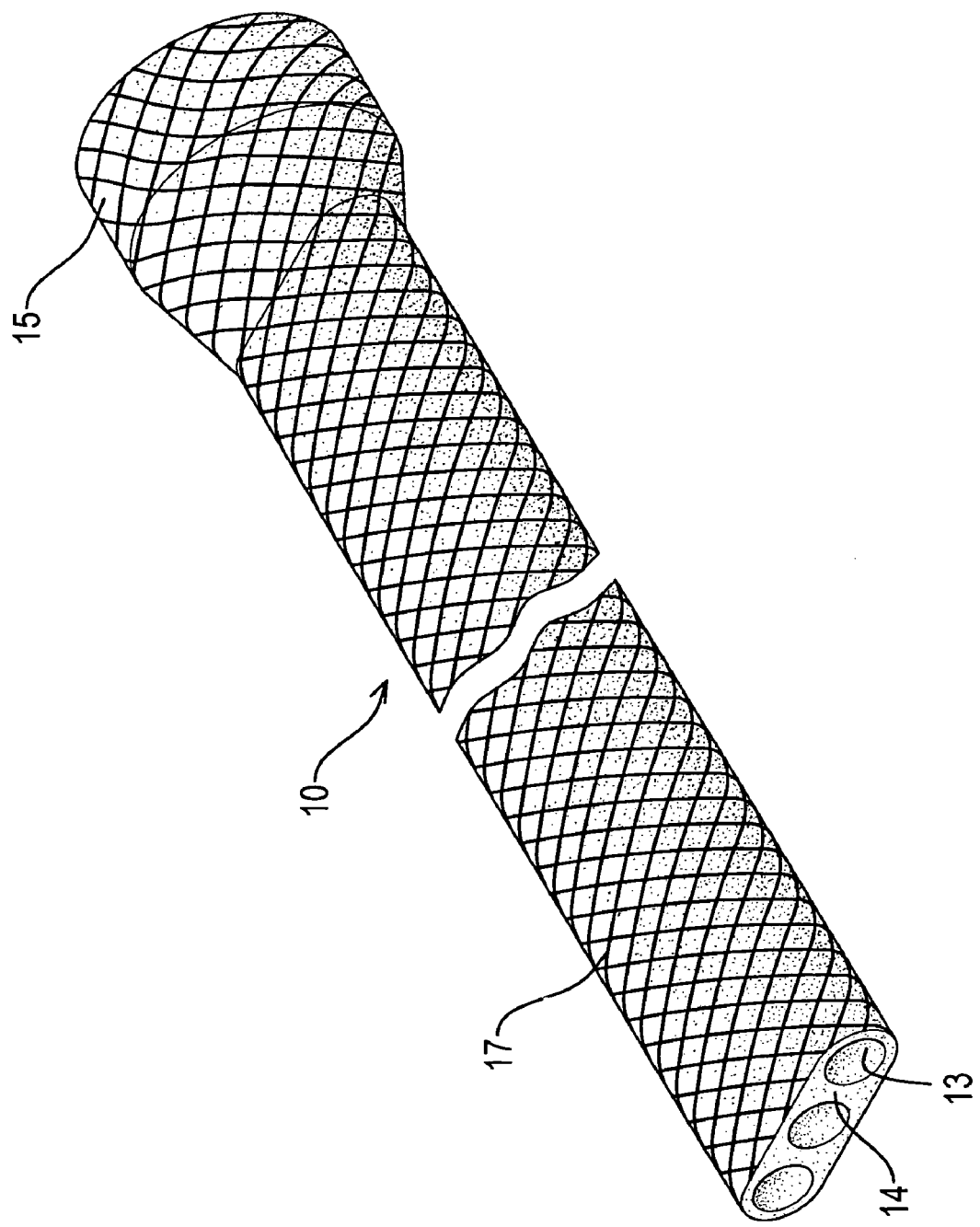
FIG. 1 is a perspective view of a hose with multiple through holes in accordance with the present invention.
Figure 2:
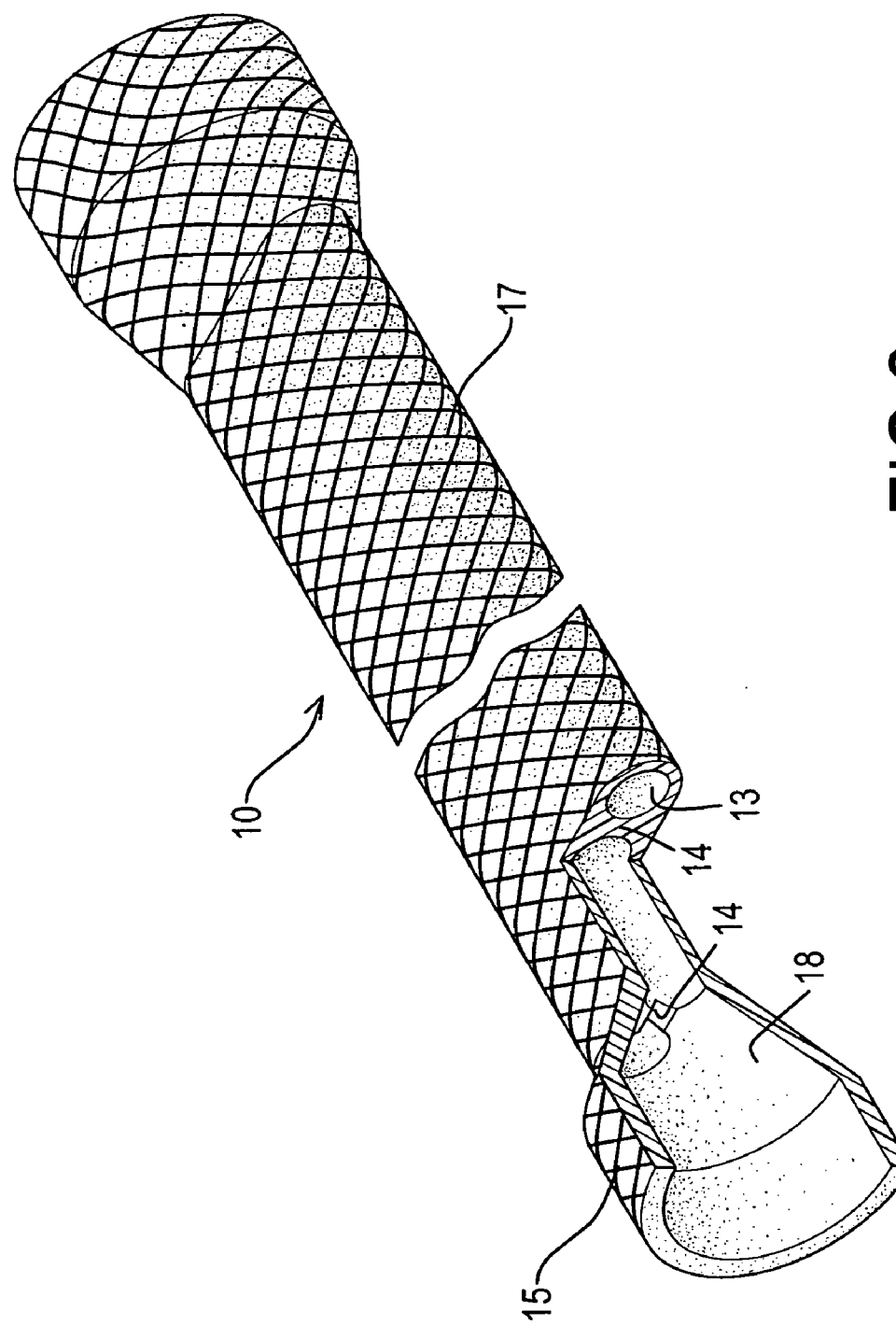
FIG. 2 is a perspective view in partial section of the hose in FIG. 1.
Figure 3:
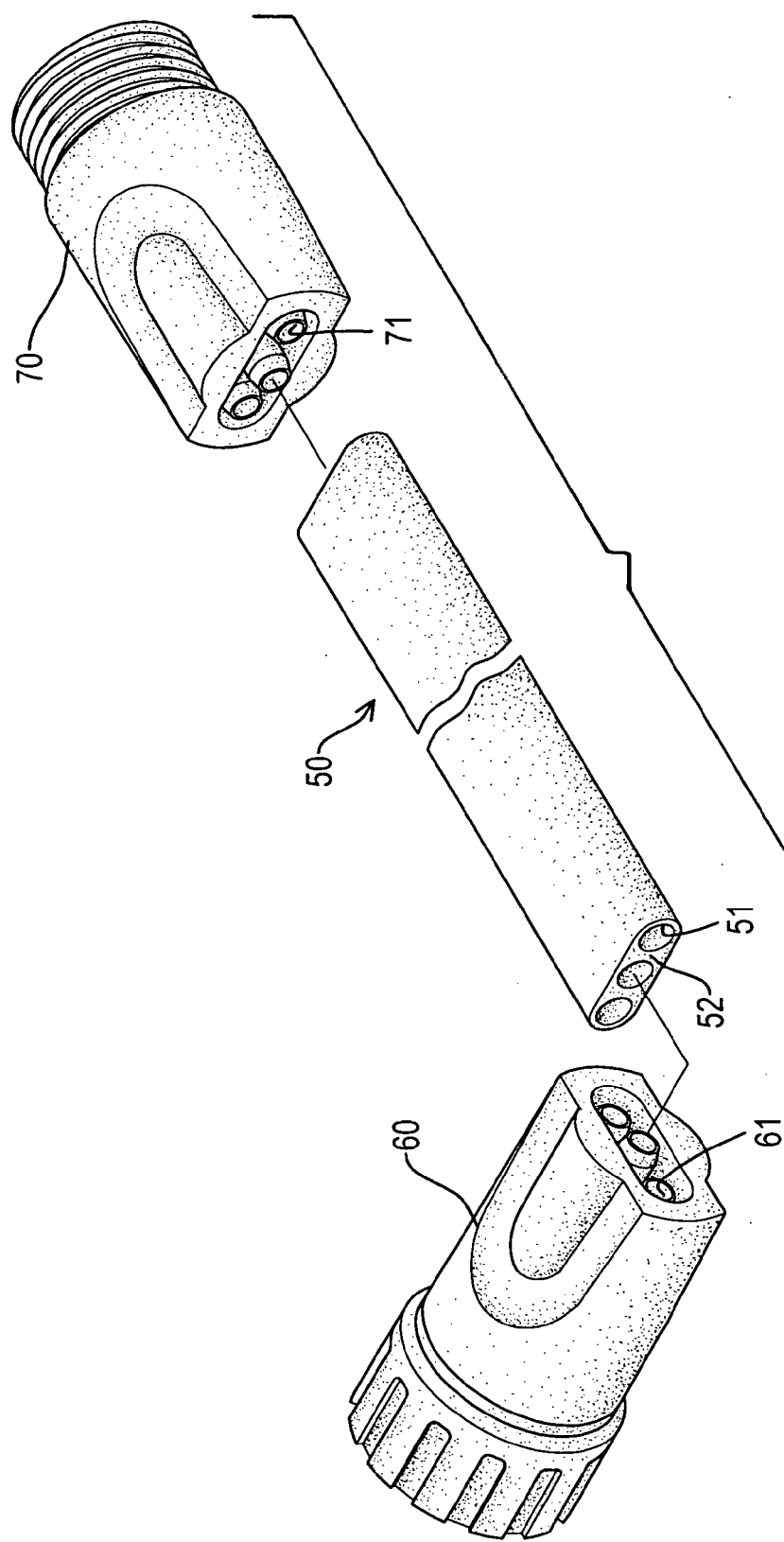
FIG. 3 is a perspective view of a conventional hose with multiple through holes in accordance with the prior art.

With reference to FIGS. 1 and 2, a hose with multiple through holes is made of a semi-rigid flexible material and comprises a hose body (10), two enlarged annular flanges (15), two cavities (18) and an optional mesh covering (17).

The hose body (10) has two ends (not numbered), an outer surface (not numbered), multiple through holes (13) and multiple partitions (14). The multiple through holes (13) are arranged abreast, pass through the hose body (10) longitudinally and have openings (not numbered) respectively at the ends of the hose body (10). A partition (14) is formed from the hose body (10) between adjacent through holes (13).

The two enlarged annular flanges (15) are formed integrally at and are connected respectively to the two ends of the hose body (10). The enlarged annular flanges (15) have open distal ends (not numbered) and proximal ends (not numbered). The proximal ends are connected respectively to the ends of the hose body (10) and enclose all the openings of the through holes (13) respectively at the ends of the hose body (10). The enlarged annular flanges (15) are attached to standard connectors (not shown) that are respectively connected to a standard outlet (not shown) and sprinkling nozzles (not shown).

The two cavities (18) are defined respectively inside the two enlarged annular flanges (15) and communicate with the through holes (13) respectively at the ends of the hose body (10) and the open distal ends of the enlarged annular flanges (15).

The optional mesh covering (17) adds strength to the hose body (10), is mounted around the outer surface of the hose body (10) and may be made of nylon fiber.

When the hose is twisted or bent, some of the through holes (13) in the deformed part of the hose body (10) may kink and close, but the other through holes (13) still allow fluid to pass through the hose body (10). The optional mesh covering (17) improves the strength of the hose body (10) and keeps the hose body (10) from fracturing or bursting when the hose body is twisted or bent.

The present invention has the following improvements.

1. The multiple through holes of the hose allow enough fluid to pass through when the hose body is bent or twisted to sustain a sufficient flow rate.

2. The enlarged annular flanges at the two ends of the hose body can be connected to standard connectors that can be connected to an outlet and a general sprinkling nozzle. Consequently, the cost of the hose with multiple through holes is lowered.

3. The optional mesh covering keeps the hose body from fracturing or bursting when the hose body is bent or twisted and thereby increases the life of the hose.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hose with multiple through holes being made of a semi-rigid flexible material and comprising:
   a hose body having
      two ends;
      an outer surface;
      multiple through holes arranged abreast, passing through the hose body longitudinally and having openings respectively at the ends of the hose body; and
      a partition formed from the hose body between adjacent through holes;
   two enlarged annular flanges formed integrally at and connected respectively to the two ends of the hose body and having open distal ends and proximal ends connected respectively to the ends of the hose body and enclosing all the openings of the through holes respectively at the ends of the hose body; and
   two cavities defined respectively inside the two enlarged annular flanges and communicating with the through holes respectively at the ends of the hose body and the open distal ends of the enlarged annular flanges.

2. The hose with multiple through holes as claimed in claim 1, further comprising a mesh covering mounted around the outer surface of the hose body.

3. The hose with multiple through holes as claimed in claim 2, wherein the mesh covering is made of nylon fiber.

* * * * *